United States Patent Office 3,096,362
Patented July 2, 1963

3,096,362
METHOD FOR THE MANUFACTURE OF
N-METHYLENE GLYCINONITRILE
Arthur R. Sexton, Midland, Mich., assignor to The Dow Chemical Company, Midland, Mich., a corporation of Delaware
No Drawing. Filed Jan. 11, 1960, Ser. No. 1,438
3 Claims. (Cl. 260—465.5)

The present invention is concerned with an improved method for the manufacture of N-methylene glycinonitrile. The latter compound may be prepared in known procedures by reacting together alkali metal cyanide, formaldehyde and ammonium halide. Practice of these known procedures provides yields which are not attractive commercially and are usually not greater than about 80 percent. Accordingly, it would be desirable to provide an improved and more economical method for the preparation of N-methylene glycinonitrile which would permit the manufacture of the product in greater yield and purity than obtainable in the known methods.

The new process comprises reacting glycinonitrile portionwise with formaldehyde. Good results are obtained when employing substantially equimolecular portions of the reactants; optimum yields being obtained in the employment of about a 10 percent molar excess of formaldehyde. The reaction is carried out in water as reaction medium. Upon completion of the reaction, the reaction medium may be filtered to separate the desired product. This new process gives yields greater that 92 percent and frequently as high as 95 percent based on the employed quantity of glycinonitrile.

In the practice of the present invention, it is critical and essential that the glycinonitrile be reacted portionwise with the formaldehyde. In such practice, the glycinonitrile or an aqueous solution thereof is added incrementally portionwise to the formaldehyde dissolved in the reaction medium. Other modes of bringing the reactants together should not be employed as they do not result in the production of N-methylene glycinonitrile.

The reaction between the glycinonitrile and formaldehyde is carried out in water as reaction medium. Good results are obtained when at least 1.6 moles of water are employed with each 2 moles of the sum of the employed molar quantities of glycinonitrile and formaldehyde. In a preferred procedure, at least 3 moles of water are employed with each 2 moles of the two reactants. In carrying out the reaction, the glycinonitrile and formaldehyde reagents conveniently are employed in the form of aqueous solutions containing from about 10 to 70 percent by weight of glycinonitrile and about 20 to 40 percent by weight of formaldehyde.

The reaction of the present invention is exothermic and takes place smoothly at the temperature range of from 0° to 50° C. The temperature may be controlled by regulating the rate of contacting the glycinonitrile with formaldehyde and by external cooling. Temperatures in excess of 50° C. materially reduce the yields of the desired product and should not be employed for any appreciable period of time.

The rate at which the reaction takes place has been found to vary directly with the temperature employed. At 50° C., the reaction is essentially complete when the glycinonitrile material is added gradually portionwise to the formaldehyde in about ½ hour. At the lower temperatures, reaction periods up to two hours may be required. It is usually preferred to operate at temperatures of from 20° to 30° C. At such temperatures, the reaction is essentially complete in about one hour.

In a representative operation, 104 grams (1.86 moles) of glycinonitrile in about 550 milliliters of water was added portionwise with stirring to an aqueous 35 percent solution of formaldehyde containing 60 grams (2 moles) of formaldehyde. The addition was carried out gradually over a period of one hour and at a temperature of from 20° to 22° C. Stirring was then continued for two hours and the reaction mixture thereafter filtered to separate an N-methylene glycinonitrile in a yield of 94 percent based upon the employed glycinonitrile starting regent. N-methylene glycinonitrile is a crystalline solid melting at 128° to 129.5° C.

I claim:
1. A method for the manufacture of N-methylene glycinonitrile which comprises reacting as the sole ingredients one proportion of glycinonitrile gradually portionwise with about one molecular proportion of formaldehyde in water as reaction medium with the water being employed in the proportion of at least 1.6 moles with each two moles of the sum of the employed amounts of glycinonitrile and formaldehyde, the reaction being effected by adding the glycinonitrile incrementally portionwise to the formaldehyde at such a rate that heat of reaction is evolved and the reaction temperature does not exceed 50° C.
2. The method claimed in claim 1 wherein the reaction is carried out at a temperature of from 0° to 50° C.
3. The method claimed in claim 2 wherein a 10 percent molar excess of formaldehyde is employed.

References Cited in the file of this patent
UNITED STATES PATENTS
2,405,966    Loder _____ Aug. 20, 1946
OTHER REFERENCES
Walker: "Formaldehyde" (A.C.S. Monograph 98), 1944, page 199.
Degering: "An Outline of Organic Nitrogen Compounds" (1945), pages 214 and 232.
Migrdichian: "The Chemistry of Organic Cyanogen Compounds," 1947, page 198.